UNITED STATES PATENT OFFICE.

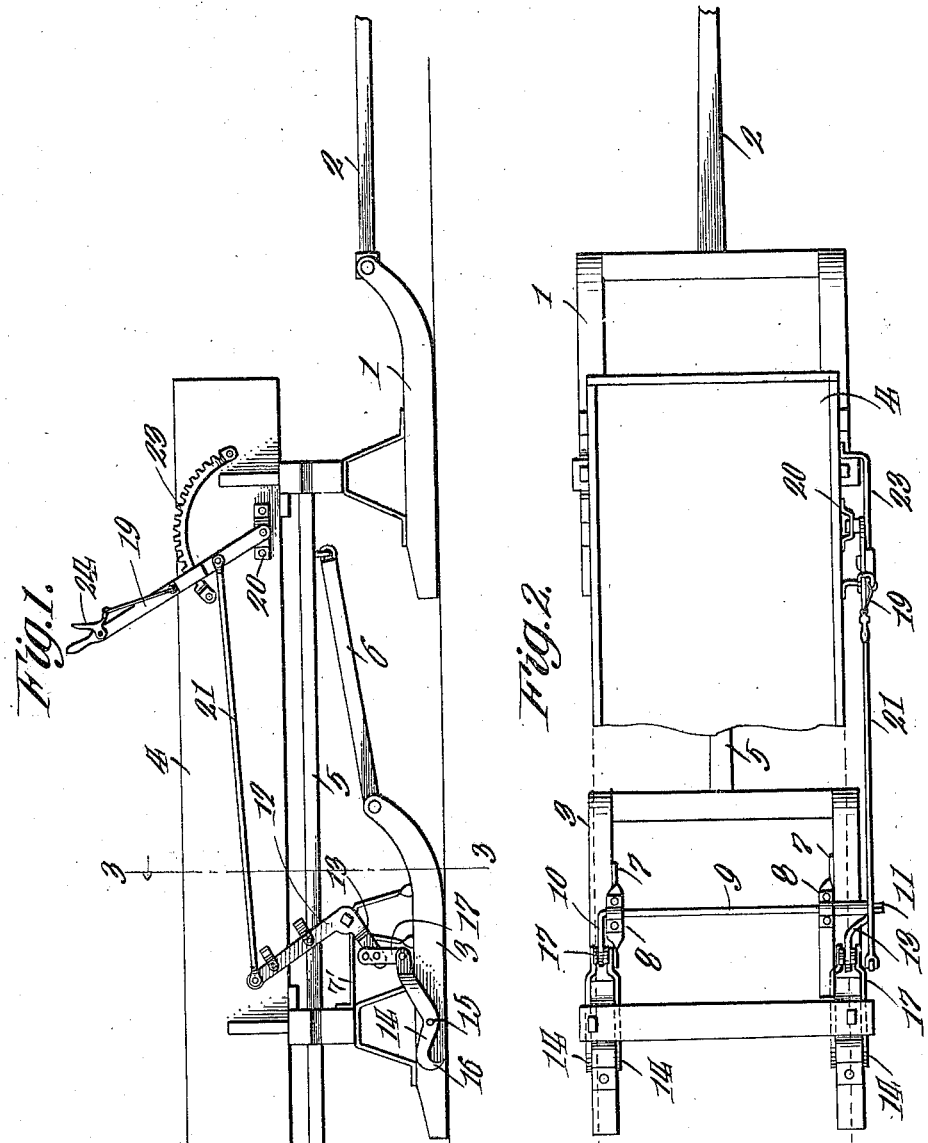

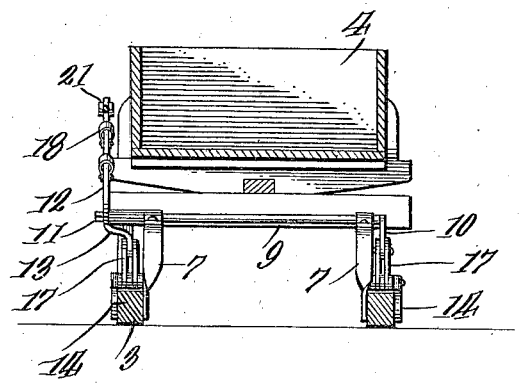
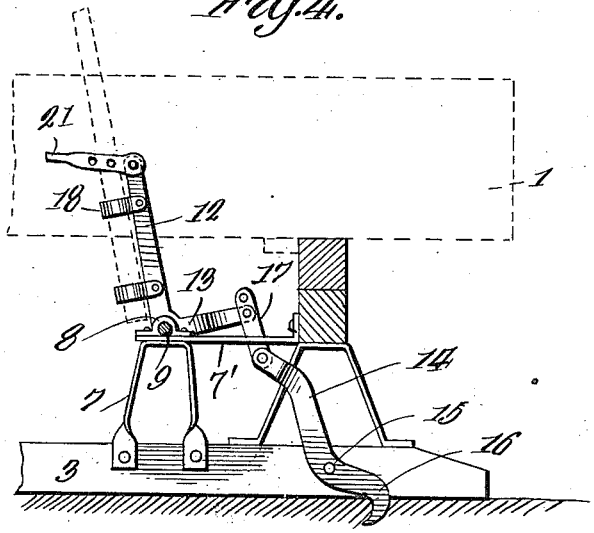

RAY W. D. AINSWORTH, OF BIGTRAILS, WYOMING.

SLED-BRAKE.

1,296,033.　　　　Specification of Letters Patent.　　Patented Mar. 4, 1919.

Application filed December 5, 1917.　Serial No. 205,562.

*To all whom it may concern:*

Be it known that I, RAY W. D. AINSWORTH, a citizen of the United States, residing at Bigtrails, in the county of Washakie and State of Wyoming, have invented certain new and useful Improvements in Sled-Brakes, of which the following is a specification.

This invention relates to sled brakes and has for its object the production of a simple and efficient means for supporting and operating the brake.

In the drawings:—

Figure 1 is a view in side elevation of a bob sled with a brake constructed after the manner of my invention fitted in conjunction therewith;

Fig. 2 is a top plan view of the structure as shown in Fig. 1 and with portions of the box broken away to more clearly illustrate the application of the brake structure;

Fig. 3 is a sectional view taken substantially on the line 3—3 of Fig. 1 and looking in the direction indicated by the arrow; and, Fig. 4 is an enlarged detail view to better disclose the mounting of the brake mechanism on the runners of the sled.

As shown the invention is applied in conjunction with a bob-sled, comprising forward runners 1 having a tongue 2 connected therewith, the back runners 3 being connected with the forward runners by the reach 5, and the body or box 4 being mounted on suitable bolsters and bolster stakes carried by the forward and back runners. A hitch or draw bar 6 connects the back runners with the reach. Bearing brackets 7 are mounted on the runners and have the bearings 8 carried thereby and raised somewhat above the runner structure. A brace 7' is secured to the top of the bearing bracket 7 and is secured at its rear end to the bolster carried by the sled runner, this brace 7 constituting a bracing means for resisting the rearward swinging movement of the bearing bracket 7. A shaft 9 is mounted in the bearings and has an arm 10 at one end and is of polygonal form as shown at 11, at the remaining end. A bell-crank lever 12 is fixed on the squared end 11 of the shaft 9 with the arm 13 thereof disposed to extend substantially parallel with the arm 10 of the shaft 9, and these arms 10 and 13 are provided with bearing openings.

Brake members 14 are mounted on the runners on pivot pins 15 and are made substantially hook-shaped to provide the brake points 16.

Links 13 connect to the brake members 14.

The long arm of the lever 12 may be grasped to move the brake members 14 to a gripping position, and if desired a suitable handle may be inserted through the loops 18. Under other circumstances, it may be desirable to provide for operating the brakes from the driver's seat, and for this purpose I pivotally mount a hand lever 19 on bearing 20 carried at the forward end of the box which lever 19 may be locked, to a segmental rack 23 mounted on the wagon box. A release 24 is provided for the lock. A link 21 connects lever 19 to lever 12.

I claim:—

In combination with a sled runner provided with a bolster, a brake member pivotally supported on said runner, an inverted substantially U-shaped bearing bracket carried by said runner, a rearwardly extending brace secured to the upper end of said bearing bracket and also to said bolster and bracing said bearing bracket against swinging movement, a shaft journaled upon said bearing bracket, operating levers secured to said shaft, and a link connected to said brace member and adjustably connected to said operating lever for facilitating the swinging of said brake member to an operative position.

In testimony whereof I affix my signature in presence of two witnesses.

RAY W. D. AINSWORTH.

Witnesses:
VERNON MUNSELL,
DELLA D. WARNER.

Copies of this patent may be obtained for five cents each, by addressing the "Commissioner of Patents. Washington, D. C."